US011933214B2

United States Patent
Allan

(10) Patent No.: US 11,933,214 B2
(45) Date of Patent: Mar. 19, 2024

(54) MULTI-CHAMBER RESERVOIR ASSEMBLY

(71) Applicant: ABC TECHNOLOGIES INC., Toronto (CA)

(72) Inventor: Richard Allan, Holland Landing (CA)

(73) Assignee: ABC TECHNOLOGIES INC. (CA)

( * ) Notice: Subject to any disclaimer, the term of this patent is extended or adjusted under 35 U.S.C. 154(b) by 309 days.

(21) Appl. No.: 17/426,337

(22) PCT Filed: Feb. 5, 2020

(86) PCT No.: PCT/CA2020/050139
§ 371 (c)(1),
(2) Date: Jul. 28, 2021

(87) PCT Pub. No.: WO2020/160656
PCT Pub. Date: Aug. 13, 2020

(65) Prior Publication Data
US 2022/0106903 A1    Apr. 7, 2022

Related U.S. Application Data

(60) Provisional application No. 62/946,051, filed on Dec. 10, 2019, provisional application No. 62/804,825, filed on Feb. 13, 2019, provisional application No. 62/802,114, filed on Feb. 6, 2019.

(51) Int. Cl.
*F01P 11/02*    (2006.01)
*B60S 1/50*    (2006.01)
*B60T 11/26*    (2006.01)

(52) U.S. Cl.
CPC .............. *F01P 11/029* (2013.01); *B60S 1/50* (2013.01); *B60T 11/26* (2013.01)

(58) Field of Classification Search
CPC ..... Y10T 137/86212; Y10T 137/86228; Y10T 137/479; B60K 2015/0344; B60T 11/26; B60S 1/50; F01P 11/029
USPC .................................................. 220/562–564
See application file for complete search history.

(56) References Cited

U.S. PATENT DOCUMENTS

| 8,678,119 B2 | 3/2014 | Singh et al. |
| 8,899,433 B2 | 12/2014 | Hill |
| 10,094,260 B2 | 10/2018 | Karsch et al. |
| 2011/0284107 A1* | 11/2011 | Ciak ...................... F01P 11/029 137/563 |

(Continued)

FOREIGN PATENT DOCUMENTS

| CN | 103726920 A | 4/2014 |
| CN | 206307537 U | 7/2017 |

(Continued)

OTHER PUBLICATIONS

Extended European Search Report from Application No. 20752409.1 dated Dec. 1, 2022.

(Continued)

*Primary Examiner* — Rafael A Ortiz
(74) *Attorney, Agent, or Firm* — McDonald Hopkins LLC

(57) ABSTRACT

Provided is a multi-chamber reservoir assembly. The assembly comprises a substantially torus-shaped housing defining an interior volume. The interior volume is subdivided with at least two sets of interior walls to define a plurality of fluid chambers. The plurality of fluid chambers are independent and separately operable.

18 Claims, 13 Drawing Sheets

(56) References Cited

U.S. PATENT DOCUMENTS

| | | | |
|---|---|---|---|
| 2015/0184803 A1 | 7/2015 | Jarzynski | |
| 2016/0045184 A1* | 2/2016 | Courtney | ............ A61B 8/4494 |
| | | | 600/424 |
| 2016/0054169 A1 | 2/2016 | Gaudiau et al. | |
| 2016/0160740 A1 | 6/2016 | Camera et al. | |

FOREIGN PATENT DOCUMENTS

| | | | | |
|---|---|---|---|---|
| CN | 108367672 A | 8/2018 | | |
| DE | 19930726 C1 | 1/2001 | | |
| EP | 1947350 A2 | 7/2008 | | |
| EP | 2141054 A1 | 1/2010 | | |
| WO | 9709561 A1 | 3/1997 | | |
| WO | 2014094919 A1 | 6/2014 | | |
| WO | 2017205973 A1 | 12/2017 | | |
| WO | WO-2017205973 A1 * | 12/2017 | ............ | B60K 11/02 |
| WO | 2018232519 A1 | 12/2018 | | |

OTHER PUBLICATIONS

The International Search Report and The Written Opinion of the International Searching Authority issue dated Jun. 25, 2020 in International Application No. PCT/CA2020/050139.
Notification of Second Office Action dated Dec. 15, 2023 in CN Appl. No. 202080012966.0.

* cited by examiner

MULTI-CHAMBER RESERVOIR ASSEMBLY

FIELD

The present disclosure pertains to fluid reservoirs, and in particular to a torus-shaped automotive fluid reservoir assembly having multiple chambers, and more particularly where each chamber of the reservoir assembly is independently and separately-operable.

BACKGROUND

The automobile has a number of different fluid systems that provide for various operations, including hydraulic power transfer (i.e. as provided by brake, power steering and clutch fluids), lubrication (i.e. as provided by engine and transmission oil), cooling (i.e. as provided by engine and AC coolant fluids), fuel (i.e. as provided by diesel and gasoline), and cleaning (i.e. as provided by windshield washer fluid). With the advancement of automotive technologies, in particular with current mandates to reduce fuel consumption and reliance upon refined petroleum products, new engine systems with additional cooling and/or fluid management requirements are being introduced.

Of particular note are hybrid electric vehicles (HEV), plug-in hybrid electric vehicles (PHEV), and battery electric vehicles (BEV) which may require two or more independent and separately-operable cooling systems, that is multiple systems operable under different temperature and/or pressure regimes. In the standard vehicle layout, many packaging/component items for fluid systems are already fixed in place. Consequently, with the addition of new fluid system components, for example coolant reservoirs for battery/motor coolant systems in HEV/PHEV vehicles, space constraints require new items to be housed within the existing space allocated. An additional challenge is mounting attachment points and hose routings may be considered hard points, requiring solutions to work within the existing mounting and routing constraints.

In view of these various challenges, in particular to accommodate additional fluid reservoirs in the engine compartment, there is an ongoing need for new fluid management solutions.

SUMMARY

According to an embodiment, provided is a multi-chamber reservoir assembly. The assembly comprises a substantially torus-shaped housing defining an interior volume. The interior volume is subdivided with at least two sets of interior walls to define a plurality of fluid chambers. The plurality of fluid chambers are independent and separately operable.

BRIEF DESCRIPTION OF THE DRAWINGS

The foregoing and other features and advantages of the disclosure will be apparent from the following description of the disclosure as illustrated in the accompanying drawings. The accompanying drawings, which are incorporated herein and form a part of the specification, further serve to explain the principles of the disclosure and to enable a person skilled in the pertinent art to make and use the disclosure. The drawings are not to scale.

DETAILED DESCRIPTION

Specific embodiments of the present disclosure will now be described with reference to the Figures, wherein like reference numbers indicate identical or functionally similar elements. The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, brief summary or the following detailed description.

Figure 1:
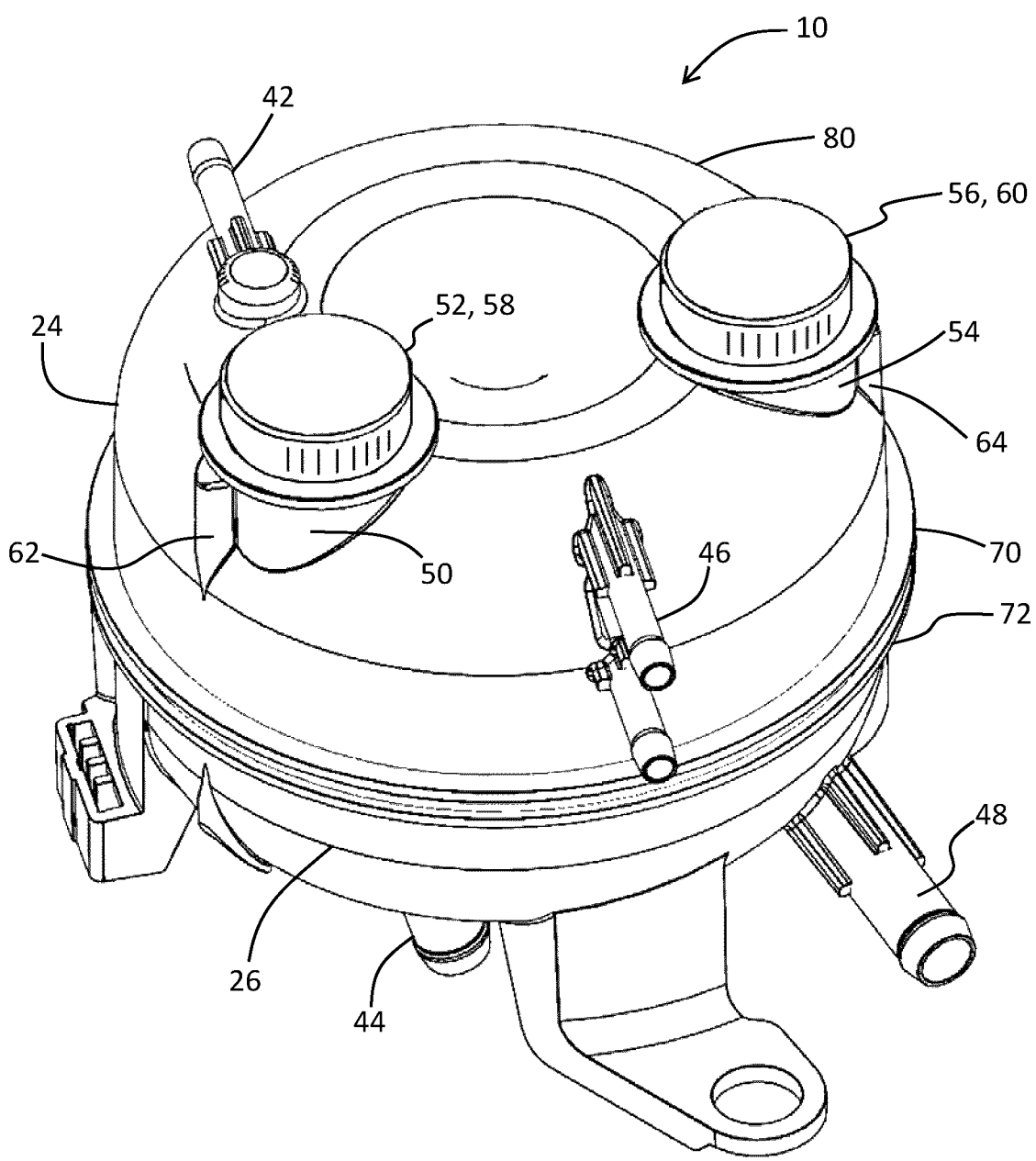
FIG. 1 is a perspective view of the reservoir assembly according to an embodiment of the invention.

Turning now to FIG. 1, shown is a reservoir assembly 10 that includes at least two independent and separately-operable chambers. For the purposes of this description, the expression "independent and separately-operable" is intended to define an arrangement where each chamber forming part of the reservoir assembly 10 is capable of independent operation relative to the other chamber(s) forming part of the same reservoir assembly 10. For example, the operational temperature and/or pressure of a first chamber in the reservoir assembly 10 may be different from the operational temperature and/or pressure of a second chamber forming part of the same reservoir assembly 10. In another example, the type of fluid used in a first chamber of the reservoir assembly 10 may be an engine coolant, while the type of fluid used in a second chamber forming part of the same reservoir assembly 10 may be a brake fluid. In yet another example, a first chamber in the reservoir assembly 10 may be pressurized, for example when used as a surge tank in an engine coolant system, while a second chamber forming part of the same reservoir assembly 10 is non-pressurized, for example when used as a windshield washer fluid reservoir. While the first and second chambers may be operated as part of the same fluid system, they may also be used in an arrangement that has them hydraulically isolated from each other.

Figure 2:
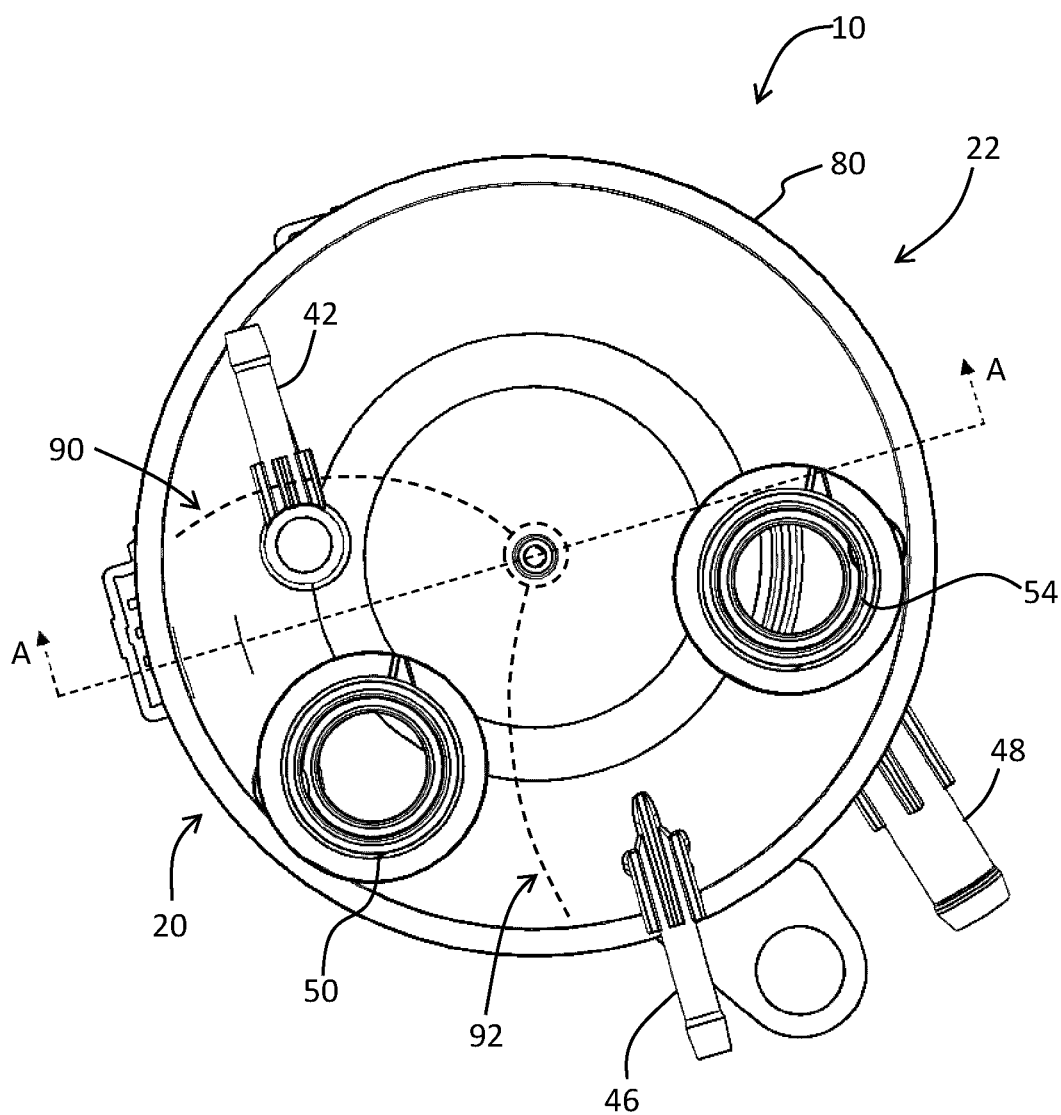
FIG. 2 is a top view of the reservoir assembly according to FIG. 1, showing the arrangement of the interior walls that delineate the first and second fluid chambers.
Figure 3:
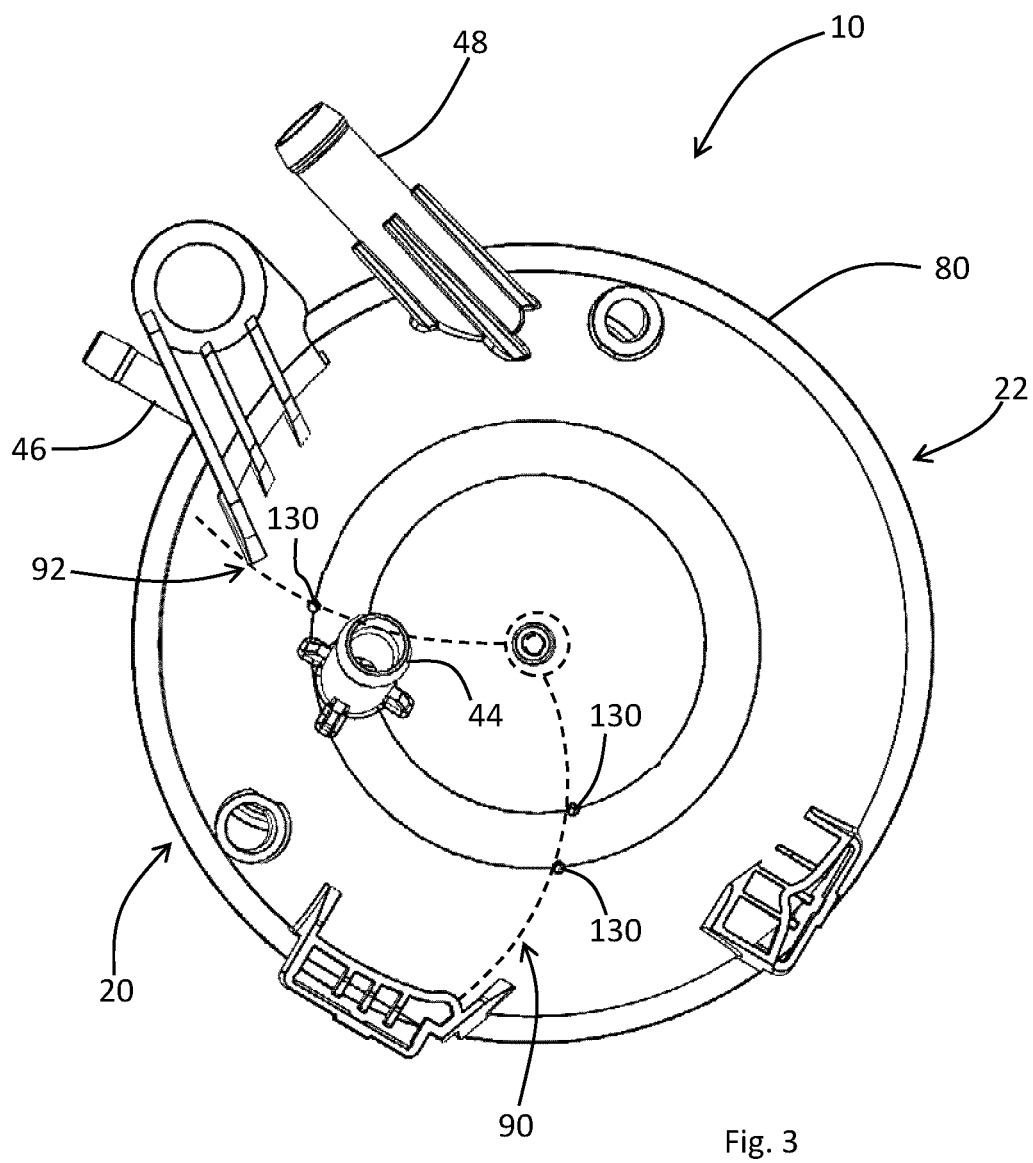
FIG. 3 is a bottom view of the reservoir assembly according to FIG. 1, showing the arrangement of the interior walls that delineate the first and second fluid chambers.
Figure 4:
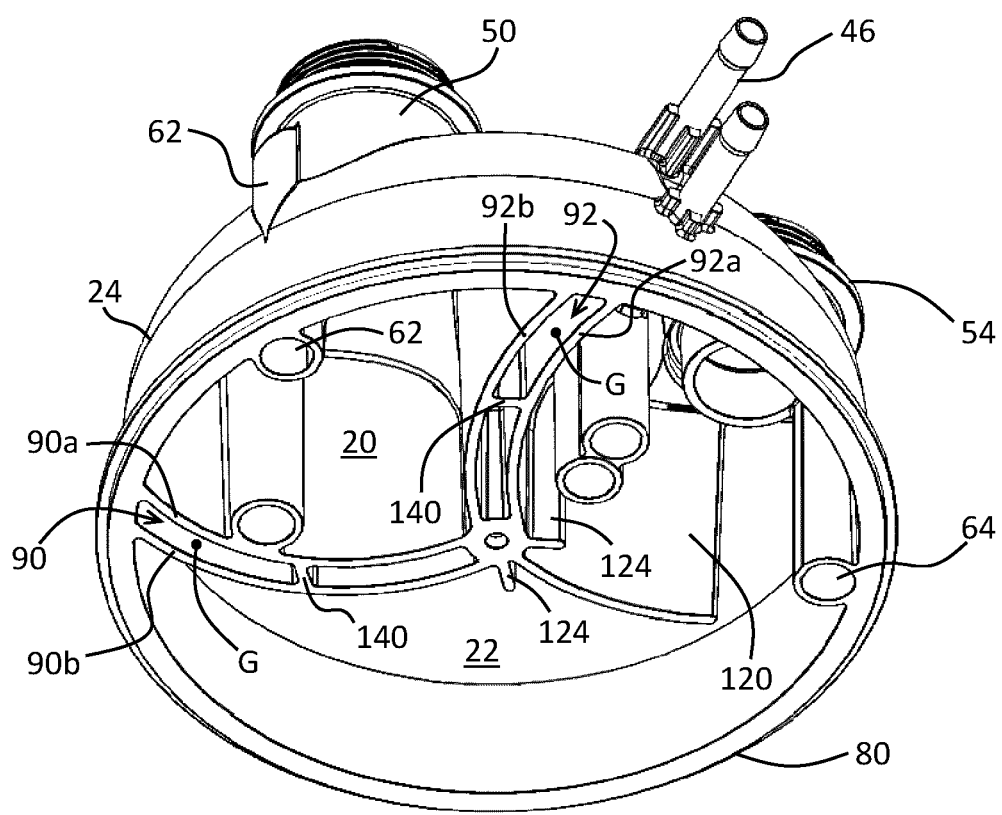
FIG. 4 is a perspective view of the first reservoir member of the reservoir assembly according to FIG. 1, showing the arrangement of the interior walls that delineate the first and second fluid chambers.

With reference to FIGS. 1 to 3, the reservoir assembly 10 is a multi-chamber reservoir assembly 10, including a first fluid chamber 20 and a second fluid chamber 22. The multi-chamber reservoir assembly 10 may be constructed in a number of ways, but as shown, it includes an assembly of a first reservoir member 24 and a second reservoir member 26. In this arrangement, the first reservoir member 24 may be regarded as an upper portion, while the second reservoir member 26 may be regarded as a lower portion.

The multi-chamber reservoir assembly 10 is delineated by a substantially torus-shaped housing 80. The definition "substantially torus-shaped" means that the wall structure of the housing 80 has a similar shape as a surface formed by a closed curve which has revolved around the axis on the same plane. Further, the definition "substantially toms-shaped" means that the closed curve can be for example circular, but it can also be oval and it may include straight sections in the upper and lower parts thereof and on each side, and the curve may even be rectangular. With reference now to FIGS. 4 to 8, the closed curve defining the toms-shaped housing 80 provides an outer wall 82, an inner wall 84, an upper wall 86, and a lower wall 88, the walls collectively defining an overall internal volume. The housing 80 additionally includes a system of radially-arranged internal walls to subdivide the internal volume into the first fluid chamber 20 and the second fluid chamber 22. As shown, a first set of internal walls 90 and a second set of internal walls 92 are provided to define the first and second fluid chambers 20, 22. The arrangement of the first and second set of internal walls is selected to achieve a desired volume for the first and second fluid chambers 20, 22. As shown, the first and second set of internal walls are arranged to define a volume of V1 for the first fluid chamber 20, and a volume of V2 for the second fluid chamber 22, where the volume of the first fluid chamber 20 is less than the volume of the second fluid chamber 22 (i.e. V1<V2). In other embodiments, the volumes of the first and second fluid chambers 20, 22 may be the same (i.e. V1=V2), or the volume of the first fluid chamber 20 may be greater than the volume of the second fluid chamber 22 (i.e. V1>V2).

Figure 7:
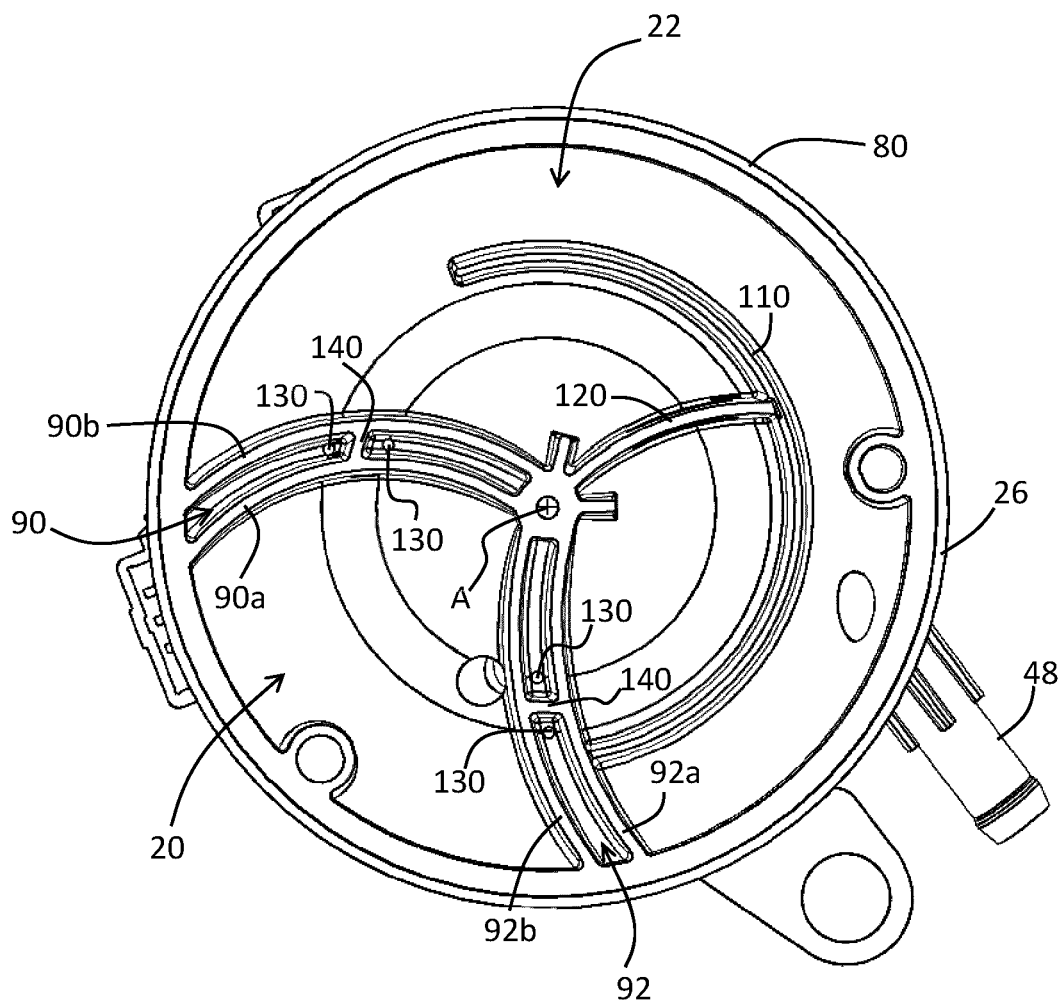
FIG. 7 is a top view of the second reservoir member of the reservoir assembly according to FIG. 1, showing the arrangement of the interior walls that delineate the first and second fluid chambers.
Figure 8:
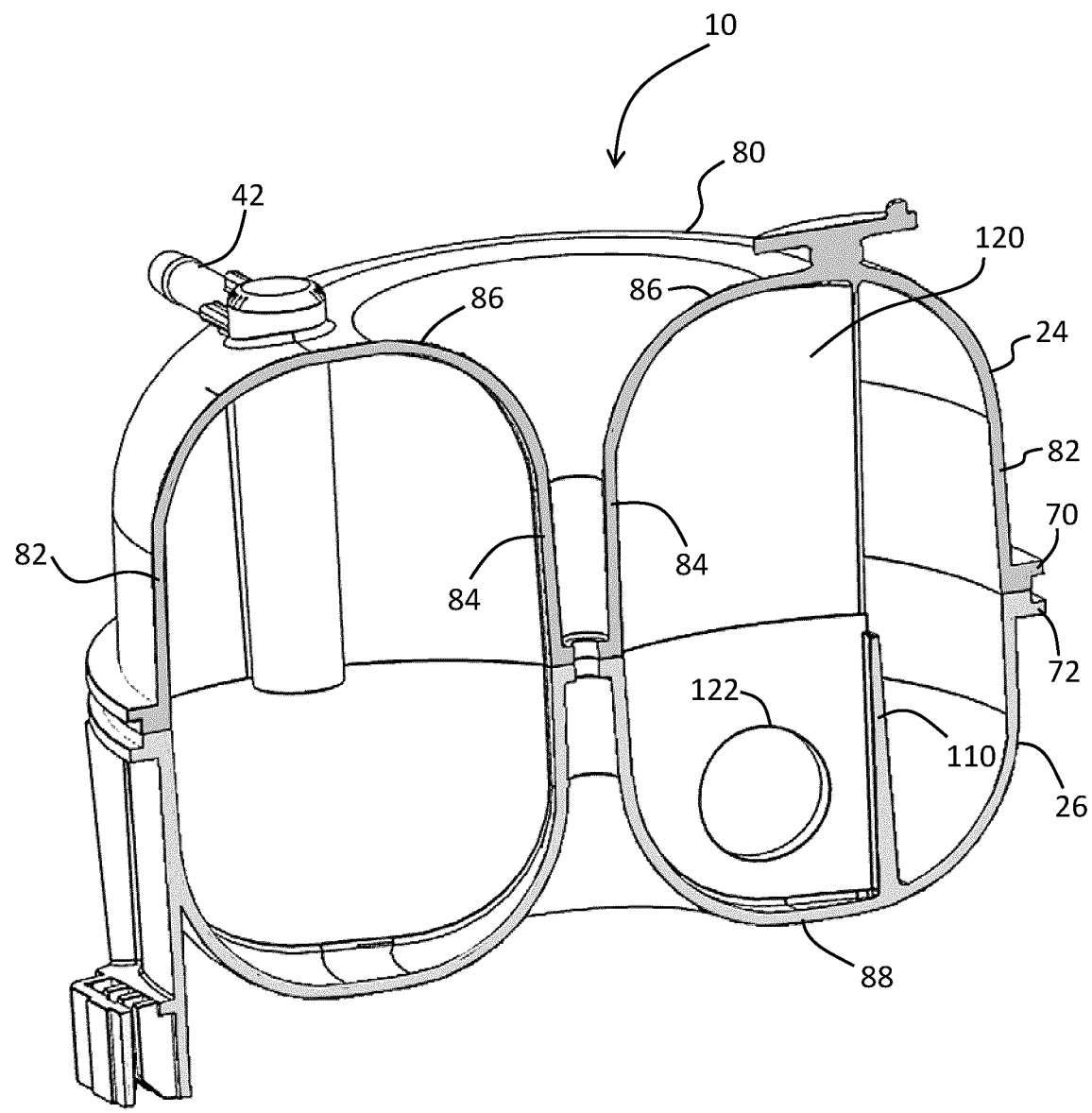
FIG. 8 is a sectional view through the line A-A (see FIG. 2) of the reservoir assembly according to FIG. 1, showing aspects of the interior structure of an assembled reservoir assembly.

The first and second set of internal walls are configured to form a gap G between the first and second fluid chambers 20, 22. More specifically, with respect to the first set of internal walls, the set includes a first internal wall 90*a* and a second internal wall 90*b* that are arranged in spaced-apart relationship to define the gap G. The second set of internal walls 92 are similarly formed, wherein the set includes a first internal wall 92*a* and a second internal wall 92*b* that are arranged in spaced-apart relationship to define the gap G. The gap G serves to reduce the potential influence of one chamber upon the adjacent chamber. For example, the gap G may serve as a thermal break between the first and second fluid chambers 20, 22, reducing thermal exchange therebetween. The gap G may also serve to reduce expansion issues, for instance where a first chamber is operated at higher temperature and/or pressure and is likely to undergo moderate chamber expansion. With gap G, any such expansion of the first chamber as a result of temperature and/or pressure will have reduced influence on the second chamber forming part of the same reservoir assembly. To facilitate this, as shown in FIGS. 3 and 7, on the underside of the housing in the vicinity of each gap spacing between the pair of internal walls, there is provided at least one vent feature or aperture 130. The vent feature or aperture 130 ensures the region of the gap, that is the spacing between the first and second internal walls (i.e. 90*a*/90*b* and 92*a*/92*b*) remains at atmospheric pressure, regardless of the pressure/temperature influence from each of the adjacent chambers.

Figure 5:
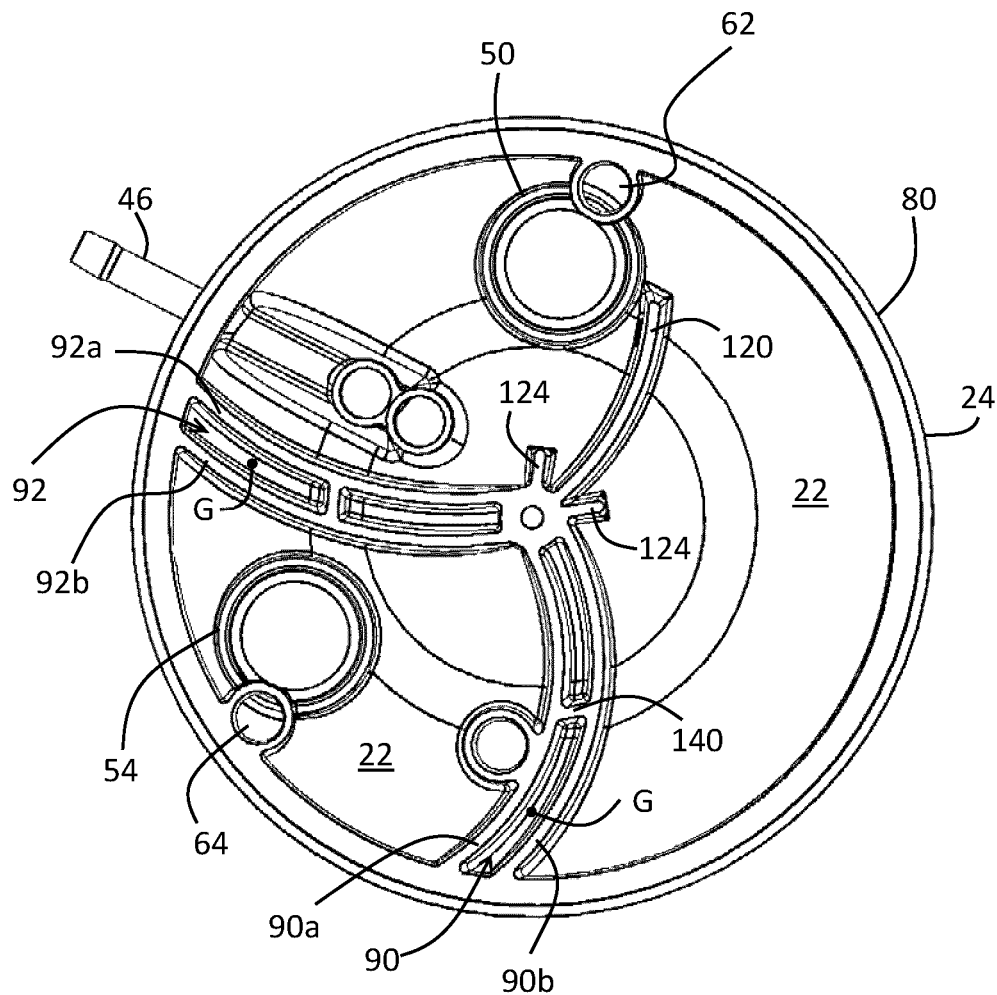
FIG. 5 is a bottom view of the first reservoir member of the reservoir assembly according to FIG. 1, showing the arrangement of the interior walls that delineate the first and second fluid chambers.

For each of the set of internal walls 90, 92, the first and second internal walls are arcuate-shaped having regard to the plane shown for example in FIG. 5. As shown, the internals walls extend radially so as to span between the outer and inner walls 82, 84 of the housing 80, and arranged in spaced apart relationship to establish the gap G therebetween. In some embodiments, at least one structural bridge 140 may be added between the first and second internal walls (i.e. 90*a*/90*b* and 92*a*, 92*b*), to provided added strength and rigidity to the internal walls dividing the first and second fluid chambers 20, 22. Where a structural bridge is provided, additional apertures 130 may be added to ensure the area of the gap spacing remains at atmospheric pressure.

Figure 6:
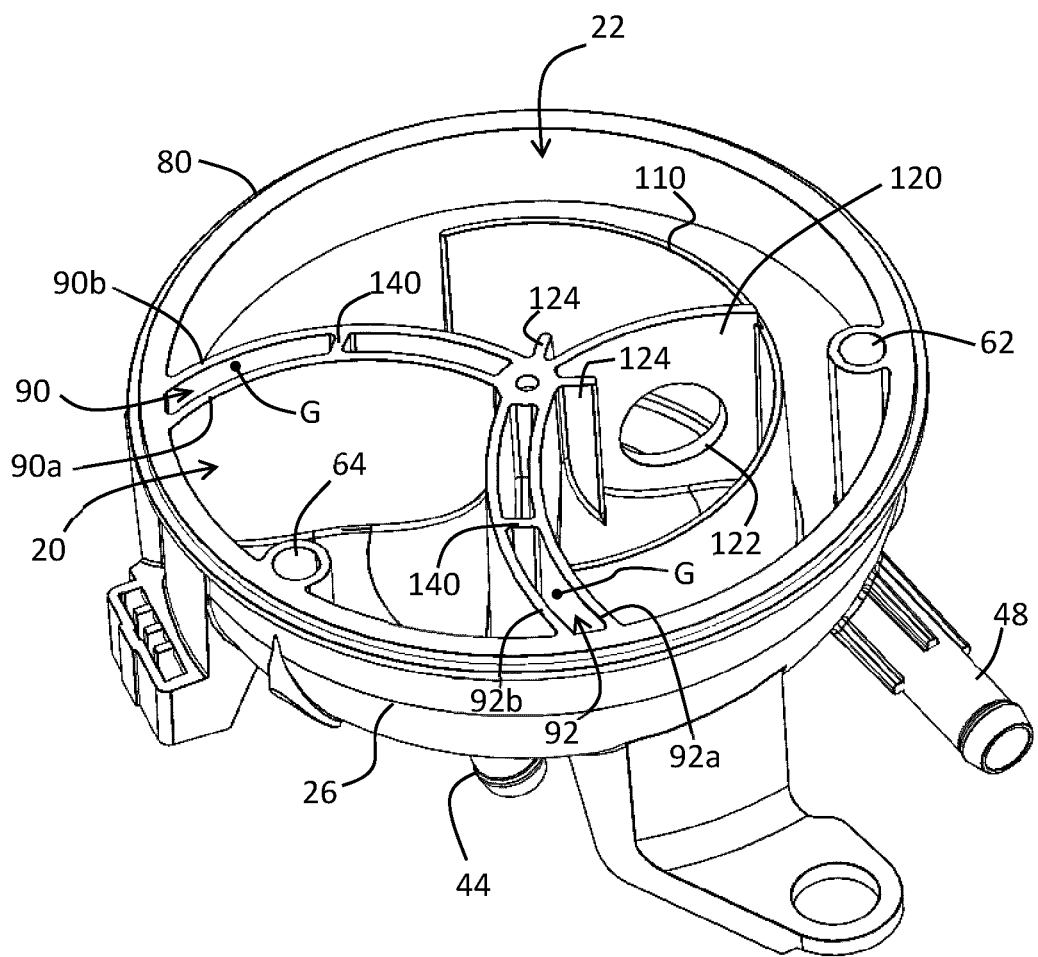
FIG. 6 is a perspective view of the second reservoir member of the reservoir assembly according to FIG. 1, showing the arrangement of the interior walls that delineate the first and second fluid chambers.

Each of the first and second fluid chambers 20, 22 may additionally include one or more internal partitions that further at least partially subdivide the internal volume of each fluid chamber into multiple sub-chambers. When subdivided, the sub-chambers may be arranged to provide a fluid path that promotes the separation of gases and steam from the fluid (i.e. coolant), as generally known in the art. The internal partitions may also be arranged to provide additional strength and rigidity to the housing 80. As shown in FIG. 6, the second fluid chamber 22 includes a partition wall 110 extending from the lower wall 88 at least a portion of the distance between the lower wall 88 and the upper wall 86. In some embodiments, the partition wall 110 may extend from about 40% to about 60% of the distance from the lower wall 88 to the upper wall 86. As shown, the partition wall 110 extends to about 45% of the distance from the lower wall 88 to the upper wall 86. It will be appreciated that partition walls extending beyond the lower and upper limits of this range are also possible. The partition wall 110 is also shown to be arranged in an arcuate configuration, concentrically positioned relative to a central axis A of the housing 80. The placement of the partition wall 110 relative to the central axis A may be from about 25% to about 75% of the radial distance from the central axis A to the outer wall 82. As shown, the placement of the partition wall 110 is about 70% of the radial distance from the central axis A to the outer wall 82. It will be appreciated that the number, dimension and arrangement of the sub-chambers may be specifically selected for a particular application, and therefore multiple variations are possible. For example, with reference to FIG. 7, shown is a housing 80 having an additional secondary partition wall 120 arranged in a similar manner to the aforementioned internal walls (i.e. first and second internal walls 90, 92). The secondary partition wall 120 may be a single wall (as shown), or a double wall. Accordingly, the secondary partition wall 120 extends radially from the inner wall 84 to the partition wall 110, and engages at least a portion of both the upper and lower walls 86, 88. To ensure passage of fluid between the sub-chambers separated by the partition walls, the partition walls (i.e. the secondary partition wall 120) may include one or more apertures 122. It will further be appreciated that in some embodiments, one or both of the fluid chambers may not contain any partitions, thus forming an undivided internal volume. Within each of the first and second fluid chambers 20, 22 the respective sub-chambers may be interconnected via a series of openings (i.e. slits, apertures; not shown) provided on the partitions, establishing the fluid path that permits the fluid to move therethrough.

The housing may additionally include other structural enhancements including but not limited to ribs and the like. In the embodiment shown, the housing 80 includes one or more radial ribs 124 extending from the inner and lower walls 84, 88.

Each fluid chamber provides at least one inlet/outlet port, which may be a singular port (i.e. when the chamber is configured for use under both pressure and vacuum), or with multiple ports. In the present embodiment, each fluid chamber provides at least one inlet and at least one outlet. As shown, the first fluid chamber 20 provides a first inlet 42 configured to receive fluid into the interior volume of the chamber 20, and a first outlet 44 configured to release/discharge fluid from the interior volume of the chamber 20. The first fluid chamber 20, by virtue of the first inlet 42 and the first outlet 44 may form part of a closed fluid loop, for example as would be found in an automotive coolant system. The second fluid chamber 22 is similarly configured, with a double inlet 46 and a second outlet 48, and may also form part of a closed fluid loop.

Each of the chambers also includes a suitable fill aperture and closure to enable fluid (i.e. coolant) to be added and/or removed from the internal volume, for example as would be required when filling and/or changing the fluid contained therein. As shown, the first fluid chamber 20 includes a first fill port 50 and a first closure 52, while the second fluid chamber 22 includes a second fill port 54 and a second closure 56 (the first and second closures 52, 56 shown only in FIG. 1). The form of the fill port and closure will depend on whether or not the chamber is intended to be operated under pressure. Where the chambers are operated as non-pressurized chambers, the area of the housing including the fill port may carry a suitable bead or collar on which a snap-fit closure cap can be fitted. Other arrangements for non-pressurized chambers may include a closure cap configured for threaded or bayonet-style engagement with the chamber housing. Where the chambers are operated as pressurized chambers, the area of the housing including the fill port may be provided with a threaded or bayonet-style interface to receive a pressure cap (i.e. a radiator-style cap). Pressure caps are known in the art, and generally provide an internal valve arrangement (i.e. a spring loaded disc valve) that opens to permit the venting of fluid from the chamber when the pressure exceeds a predefined threshold. In the embodiment shown, the chambers are shown as pressurized chambers and the first and second closures 52, 56 are shown as respective first and second pressure caps 58, 60 (see FIG. 1). In the first fluid chamber 20, the first pressure cap 58 cooperates with a first fluid release passage 62, while in the second fluid chamber 22, the second pressure cap 60 cooperates with a second fluid release passage 64 (first and second fluid release passages 62, 64 can be viewed in FIGS. 1 and 5). The first and second fluid release passages 62, 64 each include an internally formed conduit that directs vented fluid to an area below the reservoir assembly 10. The first and second fluid release passages 62, 64 are integrally formed with the first and second reservoir members 24, 26, as extensions from the upper and lower walls, respectively. It will be appreciated that the first and second pressure caps 58, 60 may also be configured to release the vented fluid directly from the respective cap, generally to an area on top of the reservoir assembly 10.

The housing defining the first and second fluid chambers 20, 22 may be shaped/formed with features that enhance strength, in particular when the chambers are intended for use under pressure. For example, the housing 80 defining the first and second fluid chambers 20, 22 may be formed with billows (not shown).

One or both of the first and second fluid chambers may also be fitted with suitable sensors (not shown for clarity) to monitor the contents thereof. For example, sensors may be used that detect operational conditions including, but not limited to, temperature, pressure, and fluid level. The housing 80 may also include at least one suitable bracket (not shown for clarity) that permits the reservoir assembly to be mounted, for example in the engine compartment of the vehicle.

Figure 9:
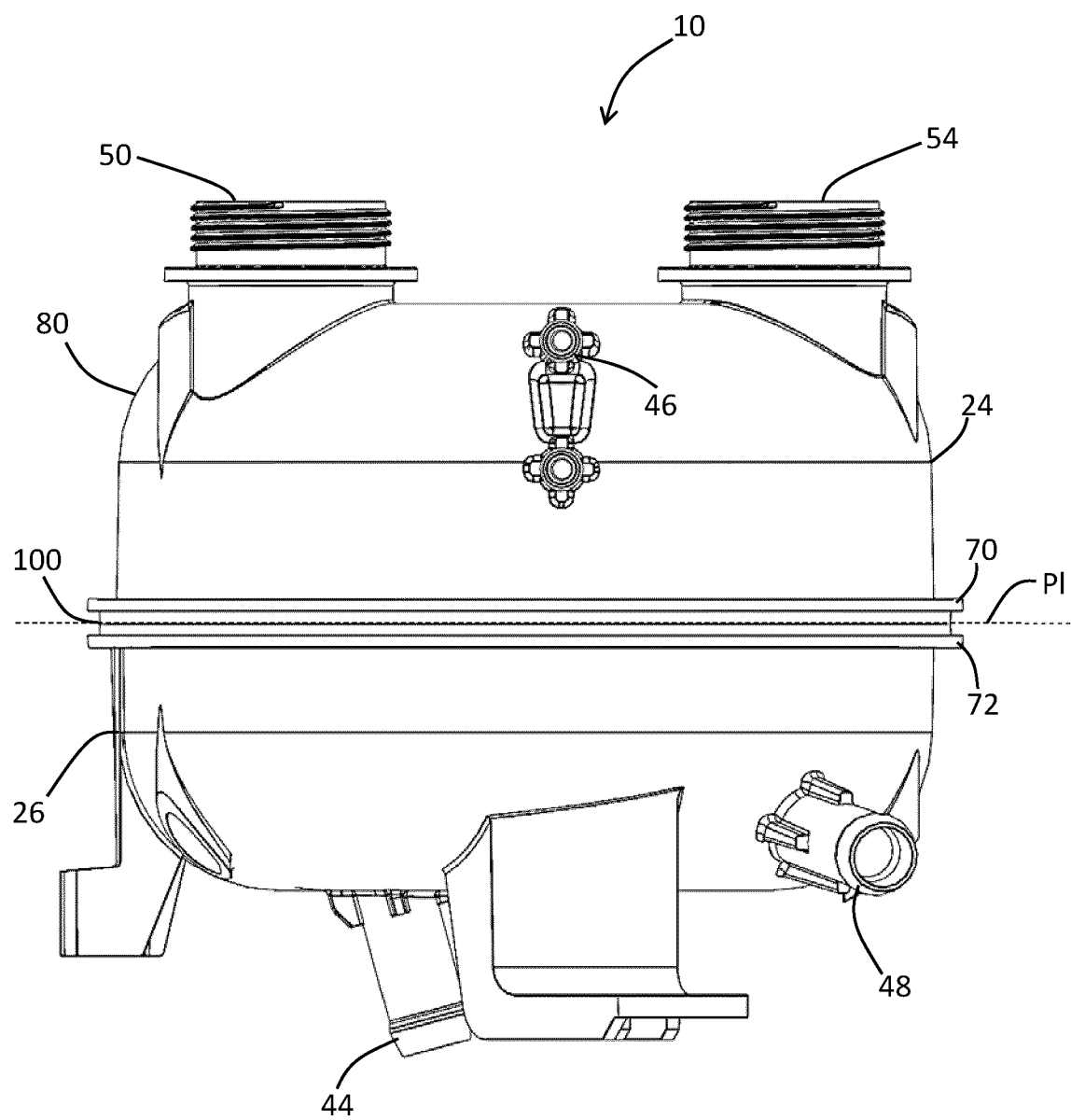
FIG. 9 is a side view of the reservoir member according to FIG. 1, highlighting features of the first and second reservoir members.
Figure 10:
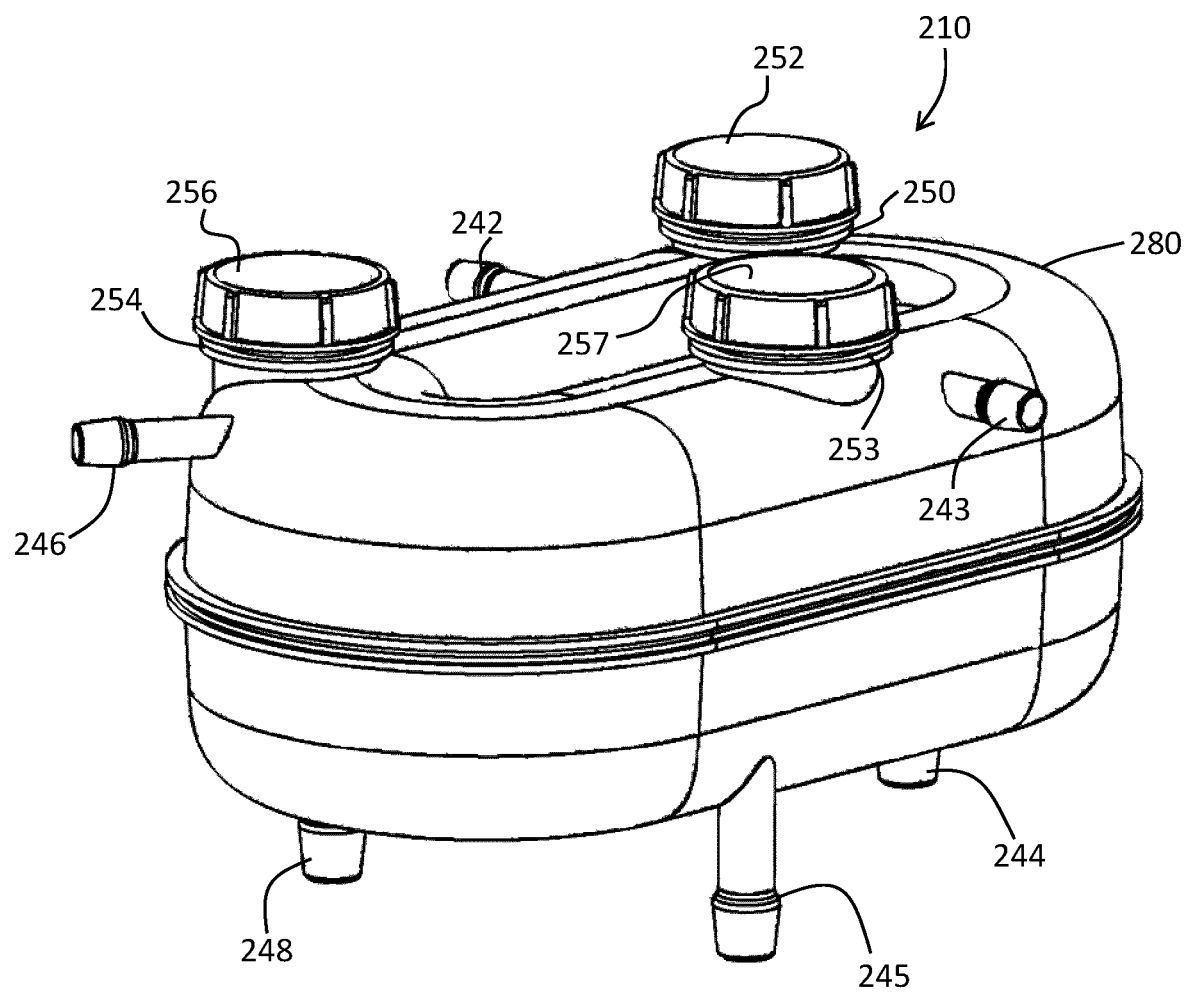
FIG. 10 is a perspective view of an alternative embodiment of the reservoir assembly having three reservoir chambers.
Figure 11:
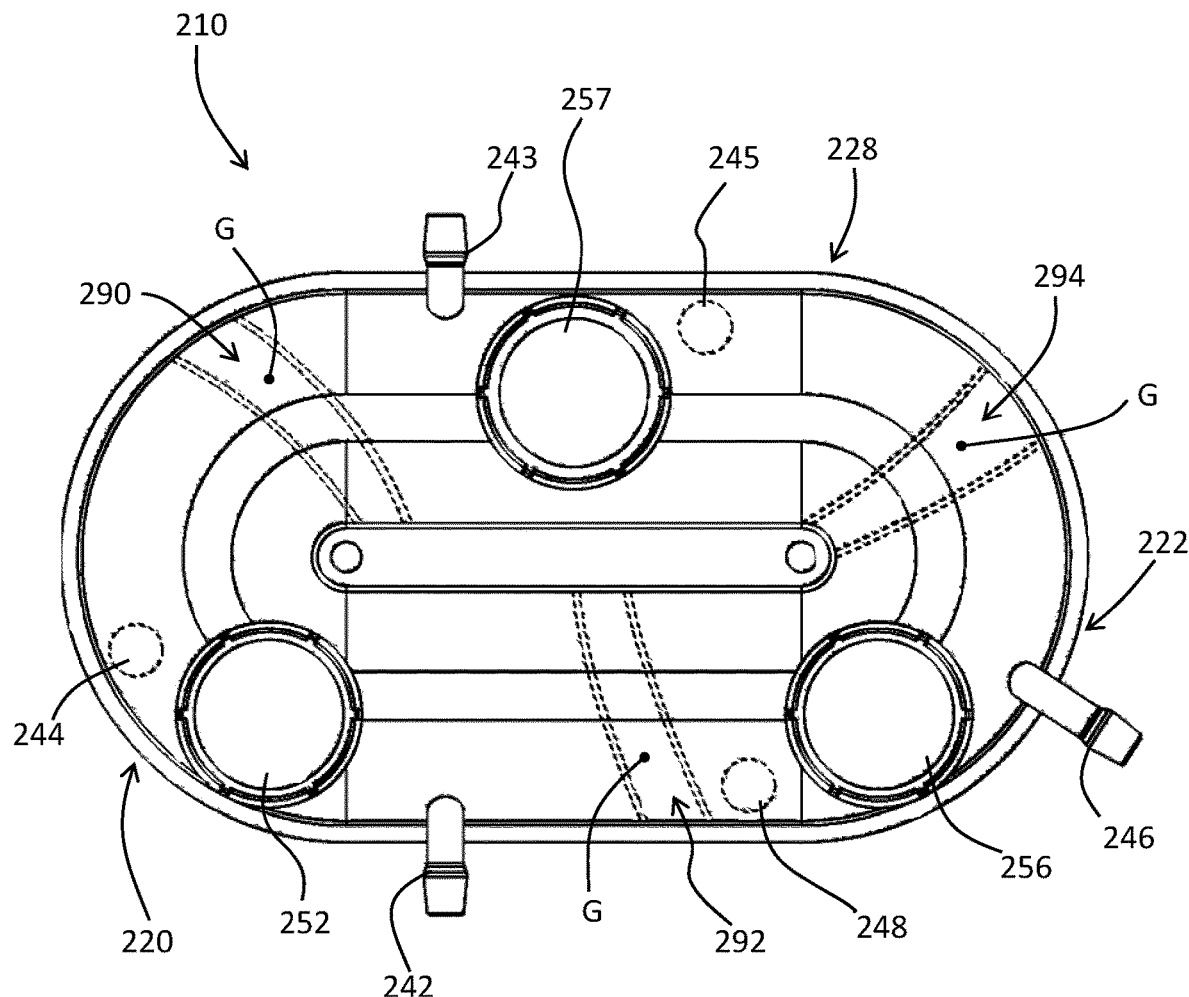
FIG. 11 is a top view of the reservoir assembly according to FIG. 10, showing the arrangement of the interior walls that delineate the first, second, and third fluid chambers.
Figure 12:
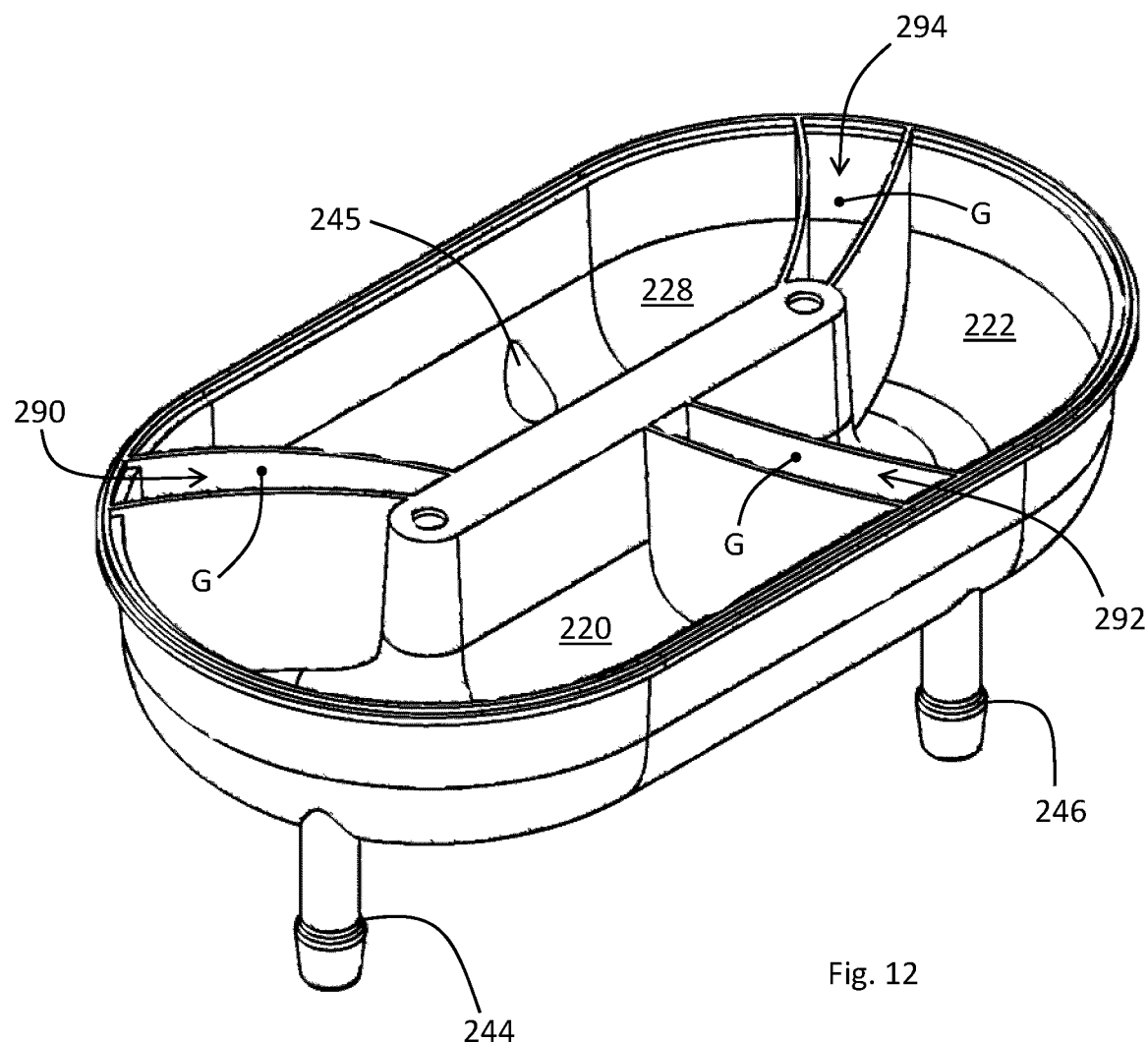
FIG. 12 is a perspective view of the lower reservoir member of the reservoir assembly according to FIG. 10, showing the arrangement of the interior walls that delineate the first, second, and third fluid chambers.
Figure 13:
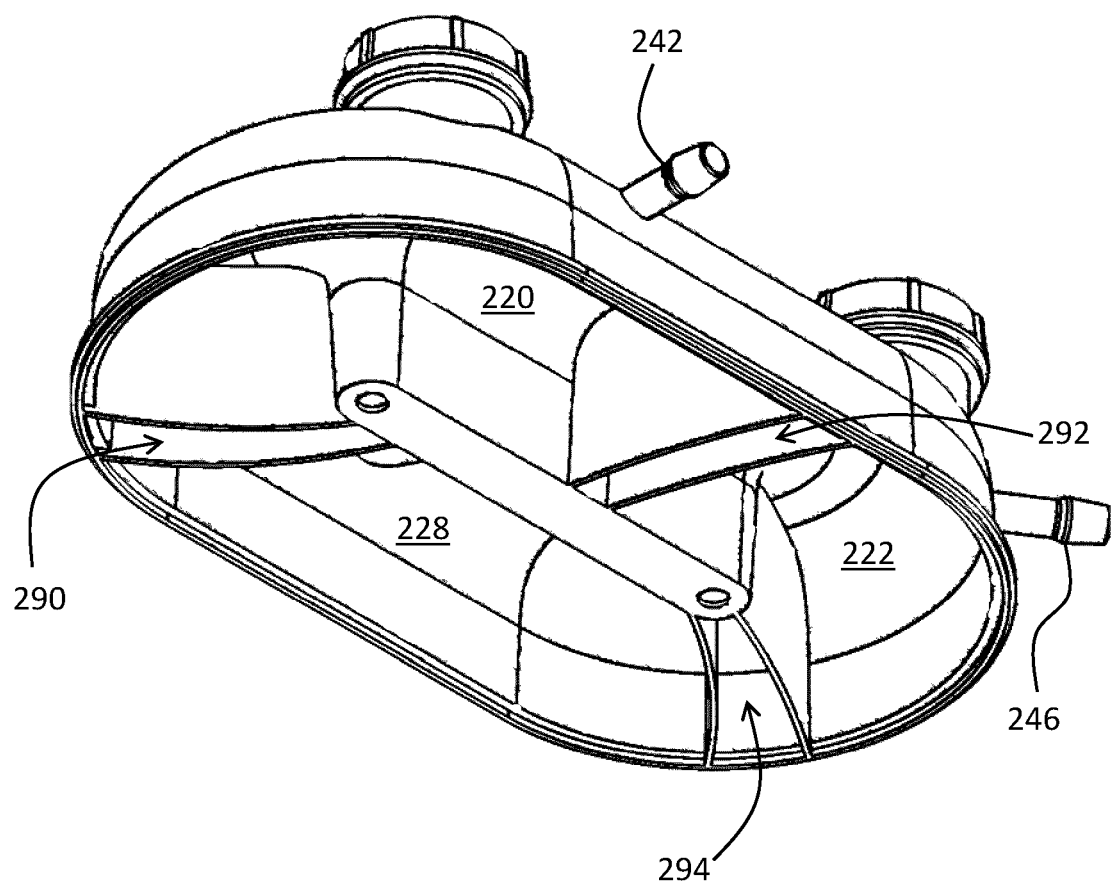
FIG. 13 is a perspective view of the upper reservoir member of the reservoir assembly according to FIG. 10, showing the arrangement of the interior walls that delineate the first, second, and third fluid chambers.

Each of the first and second reservoir members 24, 26 forming the multi-chamber reservoir assembly 10 are separately injection molded, and are formed with a peripheral flange 70, 72 forming part of the respective housing. As shown in FIG. 9, the first and second reservoir members 24, 26 mate at an assembly plane P1 adjacent the peripheral flanges—at weld interface 100—which generally divides the reservoir assembly into the upper and lower reservoir members. Each of the first and second reservoir members 24, 26 also includes at least a portion of the internal walls defining the first and second set of walls 90, 92, and therein the first and second fluid chambers 20, 22. As shown, the internal walls are also configured to meet along the assembly plane P1. Accordingly, the first and second reservoir members 24, 26 are joined together at the assembly plane P1 via the weld interface 100, as well as at the interface where the portions of the internal walls making up the first and second sets of internal walls meet.

The weld interface 100, as well as the various intermediate points of contact between the internal wall portions making up the first and second sets of internal walls 90, 92 may be joined using a variety of suitable methods that achieve a leak-tight seal. For example, the first and second reservoir members 24, 26 may be joined by heat welding, a method of assembly generally known in the art. It will be appreciated that other methods to achieve a leak-tight seal are known, and could be suitably implemented during the assembly of the multi-chamber reservoir assembly 10.

The multi-chamber reservoir assembly 10 may be made of any suitable thermoplastic, including but not limited to polypropylene, polyethylene, and polycarbonate. The thermoplastic may also include various fillers known in the art, including but not limited to mineral fillers (i.e. calcium carbonate, talc, etc.) as well as additives, including but not limited to fibrous additives (i.e. glass fibers, carbon fibers, etc.)

Although exemplified in the form of a multi-chamber reservoir assembly 10 for use in engine cooling systems, the concept could be applied to combine any of the following systems: a. PAS (hybrid electro hydraulic PAS); b. Coolant—standard engine circuit (high temp); c. Coolant—battery loop (low temp); d. Coolant—water cooled charge air cooler/fuel coolers—intermediate loop; e. Brake fluid circuit; f Washer fluid circuit; g. Clutch fluid circuit; h. Water spray for air to air charge air cooler; and i. Vacuum tank.

The multi-chamber reservoir assembly 10 has a number of advantages over fluid systems used in the prior art. Previous fluid systems incorporated stand-alone fluid reservoirs, that is one reservoir for one fluid system, and for each fluid reservoir, a separate manufacturing process was required. As a substantial improvement over these prior systems, the embodiments presented herein enable:

i) the molding operation to be simplified as a single molding operation can be used to form two independent and separately-operable fluid chambers, namely in the form of the first and second reservoir members;

ii) the welding operation to be reduced to a single operation as a result of combining two independent and separately-operable fluid chambers into the first and second reservoir members (i.e. the first and second reservoir members can be hot plate welded in a single operation by the use of a dual cavity weld nest);

iii) two fluid system may be combined, resulting in improved packaging efficiency (i.e. mounting is common for the two systems), in particular when the two fluid systems involve different fluid types (i.e. an engine coolant and brake fluid reservoir);

iv) lowered manufacturing costs.

It will be appreciated that while the multi-chamber reservoir assembly 10 has been shown as having two thermally and hydraulically isolated reservoir chambers, in some embodiments, the multi-chamber reservoir assembly 10 may include 3 or more thermally and/or hydraulically isolated reservoir chambers. For example, shown in FIGS. 10 through 13 is an alternative embodiment of the multi-chamber reservoir assembly 210 wherein the assembly is configured with three thermally and hydraulically isolated reservoir chambers.

As the multi-chamber reservoir assembly 210 is constructed in much the same way as the reservoir assembly 10 described above, only the differences will be noted in the following discussion. As shown, the multi-camber reservoir assembly 210 includes a first fluid chamber 220, a second fluid chamber 222 and a third fluid chamber 228. The reservoir assembly 210 is delineated by a substantially toms-shaped housing 280, although in this configuration, the housing 280 is provided in an oval form.

The housing 280 includes a system of radially-arranged internal walls to subdivide the internal volume into the first fluid chamber 220, the second fluid chamber 222 and the third fluid chamber 228. As shown, a first set of internal walls 290, a second set of internal walls 292, and a third set of internal walls 294 are provided. It will also be noted that the first set of internal walls 290, the second set of internal walls 292, and the third set of internal walls 294 are configured to form a gap G, as previously described with respect to the first and second set of internal walls 90, 92 of the reservoir assembly 10. Accordingly, any expansion of a chamber due to temperature and/or pressure will have a reduced influence on the adjacent chamber forming part of the same assembly.

Each of the fluid chambers includes at least one inlet/outlet port, which may be a singular port, or with multiple ports. In the present embodiment, each fluid chamber provides at least one inlet and at least one outlet. As shown, the first fluid chamber 220 provides a first inlet 242 configured to receive fluid into the interior volume of the chamber 220, and a first outlet 244 configured to release/discharge fluid from the interior volume o the chamber 220. The first fluid chamber 220, by virtue of the first inlet 242 and the first outlet 244 may form part of a closed fluid loop, or example as would be found in an automotive coolant system. The second fluid chamber 222 is similarly configured, with a second inlet 246 and a second outlet 248; the third fluid chamber 228 is similarly configured, with a third inlet 243 and a third outlet 245. The second and third fluid chambers 222, 228 may each also form part of respective closed fluid loop systems.

Each of the chambers also include a suitable full aperture and closure to enable fluid to be added and/or removed from the internal volume, for example as would be required when filling and/or changing the fluid contained therein. As shown, the first fluid chamber 220 includes a first fill port 250 and a first closure 252; the second fluid chamber 222 includes a second fill port 254 and a second closure 256; the third fluid chamber 228 includes a third fill port 253 and a third closure 257. The form of the fill port and closure will depend of whether or not the chamber is intended to be operated under pressure.

Relative terms should be construed as such. For example, the term "upper" is meant to be relative to the term "lower," the term "horizontal" is meant to be relative to the term "vertical", the term "top" is meant to be relative to the term "bottom", "inside" is relative to the term "outside", "upwards" is meant to be relative to the term "downwards", and so forth. Unless specifically stated otherwise, the terms "first," "second," "third," and "fourth" are meant solely for purposes of designation and not for order or for limitation.

While various embodiments have been described above, it should be understood that they have been presented only as illustrations and examples of the present disclosure, and not by way of limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. A multi-chamber reservoir assembly comprising:
a substantially torus-shaped housing defining an interior volume,
wherein the interior volume is subdivided with at least a first set and a second set of interior walls to define a plurality of fluid chambers, wherein each of the first and second sets of interior walls include a pair of internal walls arranged in spaced-apart relationship to define a gap therebetween, and
wherein each of the pairs of interior walls of the first and second sets of interior walls are arcuate-shaped and span radially so as to span between an outer wall and an inner wall of the torus-shaped housing, and
wherein the plurality of fluid chambers are independent and separately operable.

2. The multi-chamber reservoir assembly according to claim 1, wherein the plurality of fluid chambers includes a first fluid chamber and a second fluid chamber.

3. The multi-chamber reservoir assembly according to claim 1, wherein the torus-shaped housing includes a first reservoir member and a second reservoir member, the first reservoir member being regarded as an upper portion, and the second reservoir member being regarded as a lower portion.

4. The multi-chamber reservoir assembly according to claim 1, wherein an aperture is provided on an underside of the housing in the region of the gap to vent the gap spacing to atmospheric pressure.

5. The multi-chamber reservoir assembly according to claim 1, wherein each of the pairs of internal walls of the first and second sets of interior walls includes at least one structural bridge within the region defining the gap.

6. The multi-chamber reservoir assembly according to claim 1, further comprising one or more internal partitions to partially subdivide the internal volume of each fluid chamber into multiple sub-chambers.

7. The multi-chamber reservoir assembly according to claim 6, wherein one or more of the internal partitions are arranged to extend at least a portion of the distance from a lower wall towards an upper wall of the housing.

8. The multi-chamber reservoir assembly according to claim 6, wherein one or more of the internal partitions are arranged in an arcuate configuration concentrically positioned relative to a central axis of the housing.

9. The multi-chamber reservoir assembly according to claim 2, wherein the first fluid chamber forms part of a first closed fluid loop, and the second fluid chamber forms part of a second closed fluid loop, and wherein the first and second fluid chambers are hydraulically separated from each other.

10. The multi-chamber reservoir assembly according to claim 9, wherein one of the first and second fluid chambers operates as a pressurized reservoir, while the other of the first and second fluid chambers operates as a non-pressurized reservoir.

11. A multi-chamber reservoir assembly comprising:
a substantially torus-shaped housing defining an interior volume, wherein the interior volume is subdivided with at least two sets of interior walls to define a plurality of fluid chambers; and
one or more internal partitions to partially subdivide the internal volume of each fluid chamber into multiple sub-chambers, wherein one or more of the internal partitions are arranged in an arcuate configuration concentrically positioned relative to a central axis of the housing, and
wherein the plurality of fluid chambers are independent and separately operable.

12. The multi-chamber reservoir assembly according to claim 11, wherein the plurality of fluid chambers includes a first fluid chamber and a second fluid chamber.

13. The multi-chamber reservoir assembly according to claim 11, wherein the torus-shaped housing includes a first reservoir member and a second reservoir member, the first reservoir member being regarded as an upper portion, and the second reservoir member being regarded as a lower portion.

14. The multi-chamber reservoir assembly according to claim 11, wherein each of the first and second sets of interior walls include a pair of internal walls arranged in spaced-apart relationship to define a gap therebetween.

15. The multi-chamber reservoir assembly according to claim 14, wherein an aperture is provided on an underside of the housing in the region of the gap to vent the gap spacing to atmospheric pressure.

16. The multi-chamber reservoir assembly according to claim 14, wherein each of the pairs of internal walls of the first and second sets of interior walls are arcuate-shaped and span radially so as to span between an outer wall and inner wall of the housing.

17. The multi-chamber reservoir assembly according to claim 14, wherein each of the pairs of internal walls of the first and second sets of interior walls includes at least one structural bridge within the region defining the gap.

18. The multi-chamber reservoir assembly according to claim 11, wherein one or more of the internal partitions are arranged to extend at least a portion of the distance from a lower wall towards an upper wall of the housing.

\* \* \* \* \*